(No Model.)
J. B. DAVIS & C. L. BERGER.
SOLAR SCREEN ATTACHMENT TO TELESCOPES.
No. 249,022.  Patented Nov. 1, 1881.
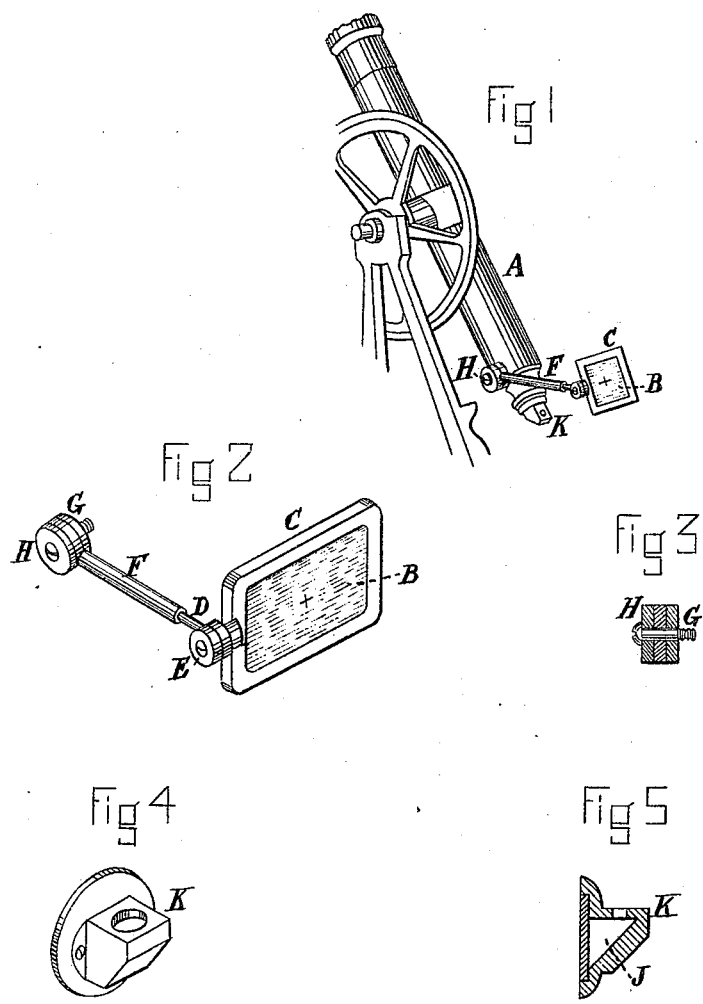
WITNESSES
J. S. McLeod
E. Planta
INVENTORS
J. B. Davis
C. L. Berger,
by J. H. Adams

UNITED STATES PATENT OFFICE.

JOSEPH B. DAVIS, OF ANN ARBOR, MICHIGAN, AND CHRISTIAN L. BERGER, OF BOSTON, MASSACHUSETTS.

SOLAR-SCREEN ATTACHMENT TO TELESCOPES.

SPECIFICATION forming part of Letters Patent No. 249,022, dated November 1, 1881.

Application filed December 13, 1880. (No model.)

*To all whom it may concern:*

Be it known that we, JOSEPH B. DAVIS, of Ann Arbor, county of Washtenaw, State of Michigan, and CHRISTIAN L. BERGER, of Boston, in the county of Suffolk and State of Massachusetts, have invented a new and useful Solar-Screen Attachment to Telescopes, of which the following is a specification.

Our invention relates to a means for finding the position in azimuth of the line of sight of an engineer's transit or other suitable instrument by a solar observation with a telescope, and also to the establishment of a meridian line by the same observation.

The object of our invention is to entirely avoid all the extra or added adjustments that the solar attachments and apparatus in common use make necessary, to simplify the work of reducing observations of this kind and to reduce the labor as required by accurate practice with other devices, to provide an apparatus comparable in the delicacy of its indications with the other parts of a good engineer's transit, and to accomplish these things without adding materially or noticeably to the weight of the instrument or to interfere sensibly with its ordinary use independently of any solar work.

The invention consists of a screen composed of paper, horn, ivory, glass, metal or other suitable material, but preferably of a semi-transparent material for convenience and added working capacity, said screen being supported in any convenient way near the eye end of the telescope, so as to receive the image of the sun formed by the telescope when properly focussed.

The invention further consists in combining with the above-named screen for the purpose of obtaining solar observations a suitable prism or reflector attached to the telescope or made attachable at pleasure, the object of the combination being to enable observations to be made when the necessary direction of the telescope would otherwise prevent it. The combination referred to is with a prism made attachable to the eye-piece for the purpose of observing the sun when its altitude is such that the plate of the instrument would be in the way of a direct formation of the image on the screen.

Referring to the drawings, Figure 1 is a perspective view of a portion of a telescope, showing the screen as used in combination with the prism attached to the eye-piece of the telescope. Fig. 2 is a view of the screen with its adjustable arm. Fig. 3 shows the nut, screw, and washer by which the adjustable arm is attached to the telescope. Fig. 4 is a perspective view of the prism and its mounting, and Fig. 5 is a vertical section of the same.

A represents the telescope of a transit as commonly used by surveyors. B is a screen, composed of ground glass, or it may be made of horn, ivory, paper, or any other suitable material, but preferably it is to be semi-transparent. The said screen is inclosed in a frame, C, which is pivoted to an extension-arm, D, and provided with a set-screw, E, for securing it in any desired position. The extension-arm D is arranged to slide in a tubular arm, F, which is attached to the telescope by means of a screw, G, and a friction-disk, H, as seen in Fig. 2, so as to enable the arm and screen to be adjusted at any desired angle and distance from the prism.

K, Figs. 4 and 5, represents the mounting or frame inclosing the prism J, which latter may be rectangular or of other suitable angular shape.

Our invention can be readily applied to any transit instrument already made or in use.

The operation of our invention is as follows: The telescope being set so that the sun's rays pass through it, the various lenses and the screen can be so adjusted with reference to each other by means of the ordinary focussing-screws and motions of the telescope, and by a movement in the screen that an image of the sun will be formed on the screen and an image of the cross-wires in the telescope at the same time and place. By means of the slow motions of the telescope, as effected by the tangent-screws, the image of the cross-wires may be made to quarter the image of the sun with exactness. The readings of the vertical limb will then enable one to ascertain, with the use of tables and an ephemeris, the position of the line of sight of the telescope in azimuth, or, in other words, enable the azimuth of the sun's center to be found. The reading of the circle being used as a reference reading and in connection with the azimuth, will enable the azimuth of any line to be found or laid down, or a meridian to be set out.

The operation of the apparatus is not confined in its workings to the sun, as similar observations of any celestial object may be taken.

Instead of arranging the screen, as above described, in front of the eye-piece, it may be attached at the outside of the eye end of the main tube of the telescope in connection with a lens suitably mounted at the object end, for the same purpose, as above described.

We are aware that the use of a semi-transparent screen to receive the image from a camera is not new, and that such screens have been used in connection with reflectors or prisms. Therefore we do not claim these devices, broadly; but

What we claim is—

1. In combination with a telescope having cross-wires, a semi-transparent screen adapted to receive the image of the sun intersected by the image of the cross-wires, substantially as described, and for the purpose set forth.

2. In combination with the eye-piece of a telescope having cross-wires and a semi-transparent screen adapted to show the image of the sun intersected by the image of the cross-wires, a prism or reflector, substantially as described, and for the purpose set forth.

3. The tubular arm F, attached to a telescope by a screw, G, in combination with the extension-arm D, attached to the screen B, substantially as and for the purpose set forth.

In testimony whereof we have signed our names to this specification in the presence of two subscribing witnesses.

JOSEPH B. DAVIS.
C. L. BERGER.

Witnesses as to signature of Joseph B. Davis:
C. A. CHAPIN,
C. E. LATIMER.
Witnesses as to signature of C. L. Berger:
JOS. H. ADAMS,
J. J. McCARTHY.